United States Patent
Kim et al.

(10) Patent No.: US 10,680,232 B2
(45) Date of Patent: Jun. 9, 2020

(54) ELECTRODE AND METHOD FOR MANUFACTURING SAME

(71) Applicant: LG CHEM, LTD., Seoul (KR)

(72) Inventors: Eun Bee Kim, Daejeon (KR); Ji Young Kim, Daejeon (KR); Hye Yeong Sim, Daejeon (KR); Jung Pil Lee, Daejeon (KR); Hye Ri Jung, Daejeon (KR)

(73) Assignee: LG Chem, Ltd. (KR)

( * ) Notice: Subject to any disclaimer, the term of this patent is extended or adjusted under 35 U.S.C. 154(b) by 97 days.

(21) Appl. No.: 15/771,285

(22) PCT Filed: Jul. 13, 2017

(86) PCT No.: PCT/KR2017/007522
§ 371 (c)(1),
(2) Date: Apr. 26, 2018

(87) PCT Pub. No.: WO2018/012902
PCT Pub. Date: Jan. 18, 2018

(65) Prior Publication Data
US 2018/0315991 A1    Nov. 1, 2018

(30) Foreign Application Priority Data
Jul. 15, 2016    (KR) .................. 10-2016-0089804

(51) Int. Cl.
*H01M 4/04* (2006.01)
*H01M 4/13* (2010.01)
(Continued)

(52) U.S. Cl.
CPC ....... *H01M 4/0404* (2013.01); *H01M 4/0402* (2013.01); *H01M 4/13* (2013.01); *H01M 4/139* (2013.01); *H01M 10/052* (2013.01)

(58) Field of Classification Search
None
See application file for complete search history.

(56) References Cited

U.S. PATENT DOCUMENTS 5,989,747 A * 11/1999 Tanaka .................... H01M 4/04
429/209
2002/0176929 A1    11/2002 Jito et al.
(Continued)

FOREIGN PATENT DOCUMENTS

JP    2005-183181 A    7/2005
JP    2005-216723 A    8/2005
(Continued)

OTHER PUBLICATIONS

International Search Report (PCT/ISA/210) issued in PCT/KR2017/007522, dated Dec. 13, 2017.
(Continued)

*Primary Examiner* — Scott J. Chmielecki
(74) *Attorney, Agent, or Firm* — Lerner, David, Littenberg, Krumholz & Mentlik, LLP

(57) ABSTRACT

The present invention relates to an electrode and a method for manufacturing the electrode, which are for maintaining the uniformity of the thickness of an electrode coating layer in the electrode.
In addition, the present invention is characterized by including a preparation step for preparing an electrode foil, an attachment step for attaching an adhesive member onto a portion of the electrode foil, a coated part formation step for coating an active material onto the electrode foil, and an uncoated part formation step for forming an uncoated part on the electrode foil by removing the adhesive member along with the active material coated onto the adhesive member.

4 Claims, 2 Drawing Sheets

(51) Int. Cl.
*H01M 4/139* (2010.01)
*H01M 10/052* (2010.01)

(56) References Cited

U.S. PATENT DOCUMENTS

| | | |
|---|---|---|
| 2010/0227211 A1 | 9/2010 | Chang et al. |
| 2010/0248027 A1 | 9/2010 | Zhang et al. |
| 2012/0177985 A1 | 7/2012 | Kuo et al. |
| 2013/0236772 A1 | 9/2013 | Kim et al. |
| 2014/0004399 A1* | 1/2014 | Kim .............. H01M 10/0587 429/94 |
| 2014/0349179 A1* | 11/2014 | Chun .............. H01M 10/4235 429/211 |
| 2016/0036009 A1* | 2/2016 | Cho .................. H01M 2/34 429/179 |
| 2016/0285134 A1* | 9/2016 | Sasaki ................ H01M 4/661 |
| 2017/0155166 A1* | 6/2017 | Wu .................. H01M 10/0431 |
| 2018/0226630 A1* | 8/2018 | Yanai .................... B21B 3/00 |

FOREIGN PATENT DOCUMENTS

| | | |
|---|---|---|
| JP | 2008-123848 A | 5/2008 |
| JP | 4619465 B2 | 11/2010 |
| JP | 2013-62223 A | 4/2013 |
| KR | 10-1999-028142 A | 4/1999 |
| KR | 10-2008-0037867 A | 5/2008 |

OTHER PUBLICATIONS

Written Opinion of the International Searching Authority (PCT/ISA/237) issued in PCT/KR2017/007522, dated Dec. 13, 2017.
Extended European Search Report for Application No. 17827972.5, dated Aug. 1, 2018.

* cited by examiner

[Fig. 1]
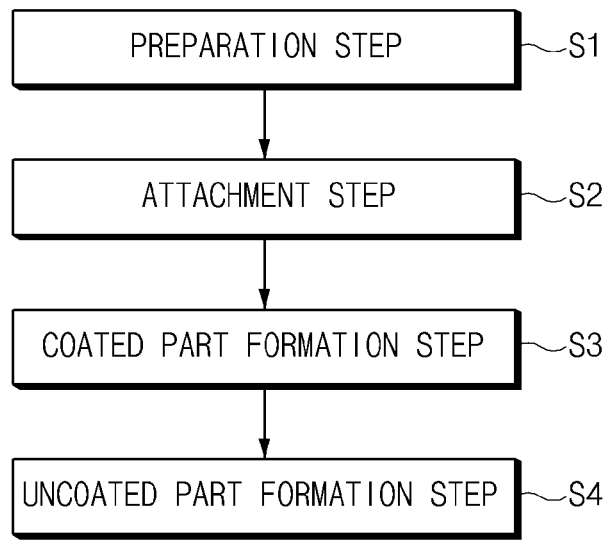
[Fig. 2]
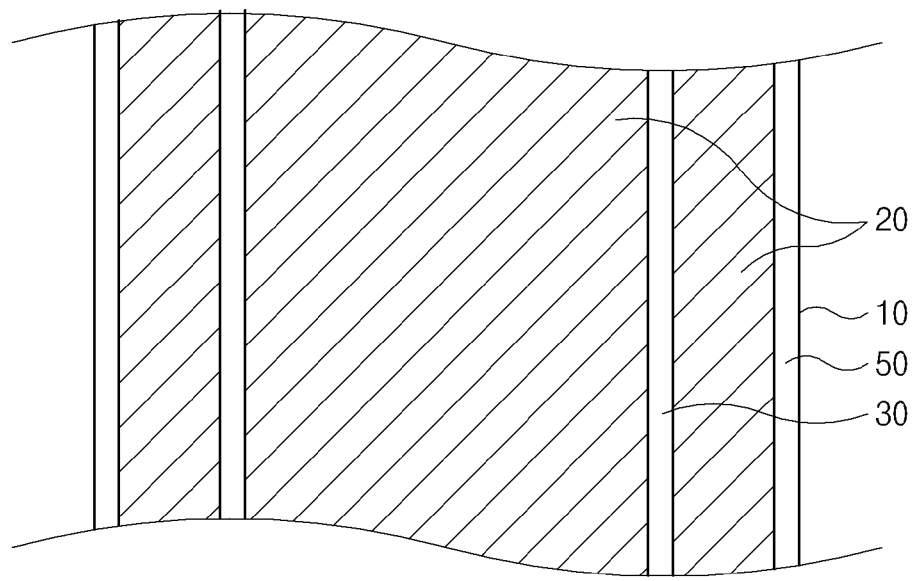

[Fig. 3]
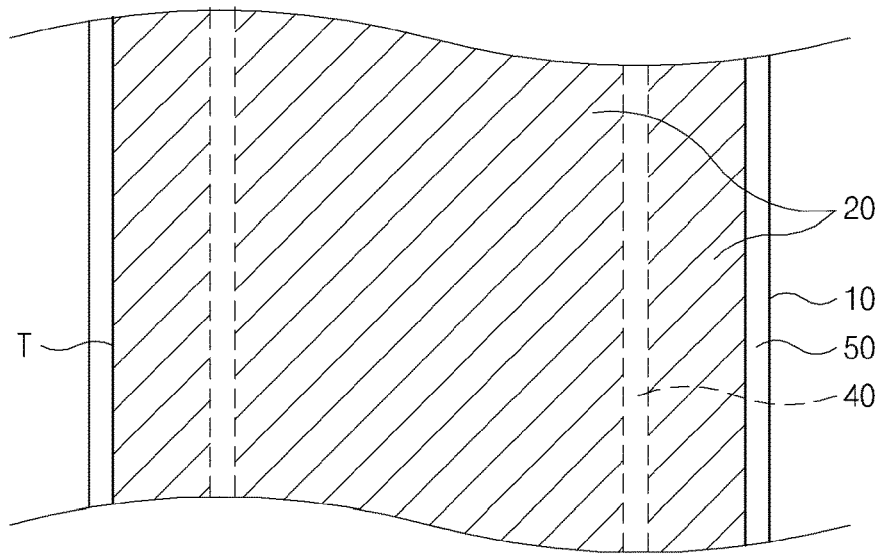
[Fig. 4]
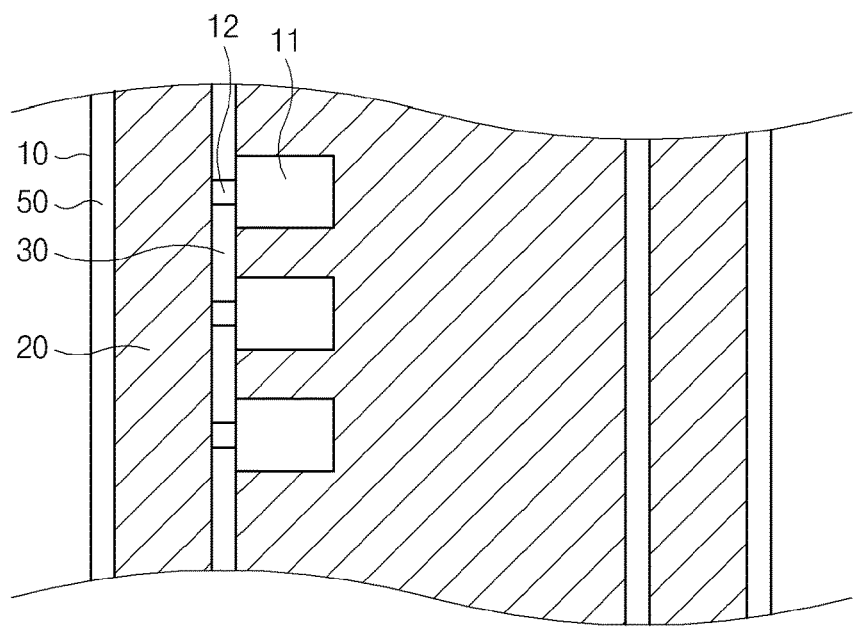
[Fig. 5]
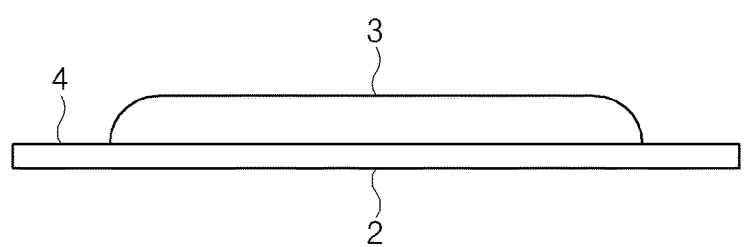

ELECTRODE AND METHOD FOR MANUFACTURING SAME

CROSS-REFERENCE TO RELATED APPLICATION

The present application claims the benefit of Korean Patent Application No. 10-2016-0089804, filed on Jul. 15, 2016, the entire disclosure of which is hereby incorporated by reference.

TECHNICAL FIELD

The present invention relates to an electrode and a method for manufacturing the electrode, and more particularly, to an electrode and a method for manufacturing the electrode, which are for maintaining the uniformity of the thickness of an electrode coating layer in the electrode.

BACKGROUND ART

In living environments surrounded by various electrical and electronic devices, batteries (cells), which generate electrical energy through physical or chemical reactions and supply power to the outside, are used when it is impossible to obtain AC power, which is supplied to buildings, or when DC power is required.

Among such batteries, primary batteries and secondary batteries, which are chemical batteries that use chemical reactions, are typically widely used, and the primary batteries, which are widely called dry batteries, are consumable batteries. Moreover, the secondary batteries are rechargeable batteries manufactured using materials in which redox reactions between a current and a material may be repeated numerous times. When a reduction reaction of the material is carried out by the current, power is charged, and when an oxidation reaction of the material is carried out, power is discharged. Electricity is generated as such charging-discharging is repeatedly performed.

Meanwhile, among the secondary batteries, lithium ion batteries are manufactured by accommodating and sealing in a cylindrical or angular can, pouch, etc., an electrode assembly, which is manufactured by coating an active material to a certain thickness on each of a positive electrode conductive foil and a negative electrode conductive foil, and then winding numerous times into a jelly roll or cylindrical shape such that a separation film is interposed between the two conductive foils.

Korean Patent Publication No. 10-2008-0037867 discloses a typical electrode assembly, a lithium secondary battery using the same, and a method for manufacturing the lithium secondary battery.

In a typical secondary battery, in order to manufacture an electrode, an active material is coated onto an electrode sheet using a stripe coating technique, and then the active material coating part is rolled.

FIG. 5 is a front view illustrating a typical electrode sheet.

As illustrated in FIG. 5, a coated part 3, which is coated with an active material, and an uncoated part 4, which is not coated with the active material, are formed on an electrode sheet 2.

However, the coating load of the coated part 3 varies according to the distance from the uncoated part 4, and thus there is a limitation in that the thickness of the active material in the coated part 3 is not uniform in a battery.

There is a limitation wherein lithium precipitation on the upper end of the battery and degradation of battery performance occur when balance between the positive electrode and the negative electrode is not achieved due to such a level of variation in active material loading in the electrode.

Moreover, there is a limitation wherein the non-uniformity in the thickness of the electrode itself increases electrode swelling.

DISCLOSURE OF INVENTION

Technical Problem

Therefore, the present invention was conceived of in order to resolve limitations such as above, and an object of the present invention is to provide an electrode and a method for manufacturing the electrode, in which the loading deviation of an active material may be minimized.

Solution to Problem

A method for manufacturing an electrode is characterized by including a preparation step for preparing an electrode foil, an attachment step for attaching an adhesive member onto a portion of the electrode foil, a coated part formation step for coating an active material onto the electrode foil, and an uncoated part formation step for forming an uncoated part on the electrode foil by removing the adhesive member along with the active material coated onto the adhesive member.

In the attachment step, the adhesive member may be attached onto the electrode foil such that the adhesive member is spaced apart a predetermined distance from an end part of the electrode foil.

In the attachment step, an adhesive film or an adhesive tape may be attached as the adhesive member onto the electrode foil.

In the coated part formation step, the active material may be coated onto the electrode foil such that an end part of the electrode foil is not coated with the active material.

In the attachment step, the adhesive member may be attached onto the electrode foil such that the adhesive member is spaced apart a predetermined distance from an outermost line of the area to be coated with the active material in the coated part formation step.

The predetermined distance may be 1.9-2.1 cm.

An electrode according to an embodiment of the present invention is characterized by including an electrode foil, a coated part, in which the electrode foil is coated with an active material, and in the coated part, an uncoated part not coated with the active material.

A reference part not coated with the active material may be formed on an end part of a surface on which the coated part is formed in the electrode foil.

The uncoated part may be spaced apart a predetermined distance from the reference uncoated part.

The uncoated part may be spaced apart a predetermined distance from an outermost line of the coated part.

The predetermined distance may be 1.9-2.1 cm.

The height of the active material in the coated part may be maintained constant, from a position adjacent to the uncoated part to a position in a central part of the coated part.

Advantageous Effects of Invention

According to the present invention, there is an effect of minimizing the loading deviation of an active material in an electrode.

According to the present invention, there is an effect of improving the uniformity of an electrode and a battery by minimizing the loading deviation of an active material in the electrode.

According to the present invention, there is an effect of minimizing a swelling phenomenon by improving the uniformity of an electrode and a battery.

According to the present invention, there is an effect of minimizing a cell degradation phenomenon by improving the uniformity of an electrode and a battery.

BRIEF DESCRIPTION OF DRAWINGS

FIG. 1 is a flow chart sequentially illustrating a method for manufacturing an electrode according to an embodiment of the present invention.

FIG. 2 is a plan view illustrating a portion of an electrode foil according to an embodiment of the present invention.

FIG. 3 is a plan view illustrating a state prior to removal of an adhesive member attached to an electrode foil according to an embodiment of the present invention.

FIG. 4 is a usage state diagram illustrating the manufacture of an electrode according to an embodiment of the present invention.

FIG. 5 is a front view illustrating a typical electrode sheet.

MODE FOR THE INVENTION

Hereinafter, detailed description is given of an electrode and a method for manufacturing the electrode according to exemplary embodiments of the present invention, with reference to the accompanying drawings.

Words or terms used in the present specification and claims should not be construed as being limited to their typical or dictionary definitions. Rather, such words or terms should be understood as having meanings or concepts in accordance with the technical concept of the present invention, on the basis of the principle wherein inventors may appropriately define the words in order to best describe their invention. Therefore, embodiments described in the present specification and configurations illustrated in the drawings are merely exemplary embodiments and do not represent the entirety of the technical concepts of the present invention, and thus it is to be understood that various equivalents exist which could substitute said embodiments at the present time of application.

In the drawings, each of the elements, or particular portions constituting said elements, have exaggerated dimensions or are excluded or schematically illustrated for ease and clarity of description. Thus, the dimensions of each of the elements do not entirely reflect their true dimensions. Detailed descriptions of relevant, well-known functions or configurations are excluded when deemed to unnecessarily make unclear the substance of the present invention.

FIG. 1 is a flow chart sequentially illustrating a method for manufacturing an electrode according to an embodiment of the present invention, FIG. 2 is a plan view illustrating a portion of an electrode foil according to an embodiment of the present invention, and FIG. 3 is a plan view illustrating a state prior to removal of an adhesive member attached to an electrode foil according to an embodiment of the present invention.

Referring to FIGS. 1 to 3, a method for manufacturing an electrode according to an embodiment of the present invention includes a preparation step S1, an attachment step S2, a coated part formation step S3, and an uncoated part formation step S4.

The preparation step S1 is a step for preparing an electrode foil 10.

The attachment step S2 is a step for attaching an adhesive member 40 onto a portion of the electrode foil 10.

The adhesive member 40 may be a material—such as an adhesive film or an adhesive tape—that does not damage the electrode foil 10 and is easy to remove from, and attach to, the electrode foil 10.

Moreover, the adhesive member 40 may be attached to the electrode foil 10 such that the adhesive member 40 is spaced apart a predetermined distance from an end part of the electrode foil 10.

In particular, the adhesive member 40 is desirably attached onto the electrode foil 10 such that the adhesive member 40 is spaced a predetermined distance from an outermost line T of an area—of the electrode foil 10—to be coated with an active material (see FIG. 3).

The area coated with the active material is termed the coated part 20, and the coated part formation step S3 is the step for coating the active material onto the electrode foil 10 with the adhesive member 40 attached.

Here, an uncoated part may be formed on an end part of the electrode foil 10 such that the active material is not coated on the end part of the electrode foil 10, and in the present invention, such an uncoated part is termed a reference uncoated part 50.

The uncoated part formation step S4 is a step for forming an uncoated part 30 on the electrode foil 10 by removing the adhesive member 40 along with the active material coated onto the adhesive member 40.

That is, when the electrode foil 10 is coated with the active material, the adhesive member 40 attached to the electrode foil 10 is also coated with the active material, and when the adhesive member 40 coated in this manner with the active material is removed from the electrode foil 10, the uncoated part 30 is formed—at the position at which the adhesive member 40 was attached to the electrode foil 10—as the active material coated onto the adhesive member 40 is removed along with the adhesive member 40.

FIG. 4 is a usage state diagram illustrating the manufacture of an electrode according to an embodiment of the present invention.

In particular, the loading amount of the active material may be 6-7% lower in the area less than about 1.5 cm from the outermost line of the active material than in other areas, and thus, as illustrated in FIGS. 3 and 4, in the present invention, by forming the uncoated part 30 by removing the adhesive member 40 after attaching the adhesive member 40 at a position—on the electrode foil 10—spaced apart about 1.9-2.1 cm from the outermost line T of the area on which the active material is to be coated onto the electrode foil 10, the active material loading deviation of an electrode manufactured from the electrode foil 10 may be minimized.

Obviously, a spacing distance of 2.1 cm or greater may also be a distance for decreasing the loading deviation.

However, the position ensuring that there is no material loss may be considered to be 1.9-2.1 cm.

Meanwhile, the adhesive member 40 may also be attached at a position spaced apart a distance of 1.9-2.1 cm from the reference uncoated part 50 formed on the end part of the electrode foil 10.

An electrode according to an embodiment of the present invention includes an electrode foil 10, a coated part 20, in which the electrode foil 10 is coated with an electrode active material, and in the coated part 20, an uncoated part 30 not coated with the electrode active material.

Such an electrode may be one among a positive electrode coated with a positive electrode active material, and a negative electrode coated with a negative electrode active material, and an electrode assembly may be manufactured by laminating multiple times, a separation film interposed between the positive electrode and the negative electrode.

Moreover, the electrode assembly may also be manufactured by winding into a jelly roll shape, a laminated body in which the positive electrode, a separation film, and the negative electrode are laminated.

The positive electrode may be an aluminum plate, and include a positive electrode coated part, which is coated with the positive electrode active material, and a positive electrode uncoated part, which is not coated with the positive electrode active material.

The positive electrode active material may be a lithium-containing transition metal oxide such as $LiCoO_2$, $LiNiO_2$, $LiMnO_2$, or $LiMnO_4$, or a lithium chalcogenide compound.

The positive electrode coated part, for example, is formed by coating a portion of at least one face of an aluminum plate with the positive electrode active material, and the remaining part—not coated with the positive electrode active material—of the aluminum plate may be the positive electrode uncoated part.

The negative electrode may be a copper plate, and include a negative electrode coated part, which is coated with the negative electrode active material, and a negative electrode uncoated part, which is not coated with the negative electrode active material.

The negative electrode active material may be a carbon material, such as a crystalline carbon, an amorphous carbon, a carbon composite, or a carbon fiber, lithium metal, or a lithium alloy and the like.

The negative electrode coated part, for example, is formed by coating a portion of at least one face of a copper plate with the negative electrode active material, and the remaining part—not coated with the negative electrode active material—of the copper plate may be the negative electrode uncoated part.

The separation film, for example, may be prepared by coating a substrate—selected from the group consisting of polyethylene (PE), polystyrene (PS), polypropylene (PP), and copolymers of polyethylene (PE) and polypropylene (PP)—with polyvinylidene fluoride-hexafluoropropylene copolymer (PVDF-HFP co-polymer).

The electrode foil 10 may form, on an end part, a reference uncoated part 50 not coated with an active material.

Moreover, the uncoated part 30 may be formed spaced apart a predetermined distance from an outermost line of the coated part 20, or formed spaced apart a predetermined distance from the reference uncoated part 50.

As illustrated in FIG. 4, it is desirable for the predetermined distance to be 1.9-2.1 cm to ensure that a unit cell 11 may be manufactured in an area in which the active material loading deviation of the coated part 20 is minimal.

In the unit cell 11, an electrode tab 12 may be installed on a portion of the uncoated part 30.

FIG. 4 shows how the unit cell 11 is cut through notching.

As described above, in the electrode according to the present invention, the active material loading deviation of the electrode may be minimized by maintaining the height of the active material constant—from a position adjacent to the uncoated part 30 to a position in a central part of the coated part 20.

According to the present invention as described above, there is an effect of minimizing the loading deviation of an active material in an electrode.

According to the present invention, there is an effect of improving the uniformity of an electrode and a battery by minimizing the loading deviation of an active material in the electrode.

According to the present invention, there is an effect of minimizing a swelling phenomenon by improving the uniformity of an electrode and a battery.

According to the present invention, there is an effect of minimizing a cell degradation phenomenon by improving the uniformity of an electrode and a battery.

Above, an electrode and a method for manufacturing the electrode according to the present invention were described in detail with reference to exemplary drawings. However, the present invention is not limited by the embodiments and drawings described above, and may be embodied in various was by a person with ordinary skill in the art within the scope of the claims.

The invention claimed is:

1. A method for manufacturing an electrode, the method characterized by comprising: a step S1 of providing an electrode foil; an attachment step S2 for attaching an adhesive member onto a portion of the electrode foil; a coated part formation step S3 for coating an active material onto the electrode foil; and an uncoated part formation step S4 for forming an uncoated part on the electrode foil by removing the adhesive member along with the active material coated onto the adhesive member, wherein the method is characterized in that, in the attachment step S2, the adhesive member is attached onto the electrode foil such that the adhesive member is spaced apart a predetermined distance from an outermost line of the area to be coated with the active material in the coated part formation step S3, and wherein the predetermined distance is 1.9-2.1 cm.

2. The method of claim 1, wherein the method is characterized in that, in the attachment step S2, the adhesive member is attached onto the electrode foil such that the adhesive member is spaced apart a predetermined distance from an end part of the electrode foil.

3. The method of claim 1, wherein the method is characterized in that, in the attachment step S2, an adhesive film or an adhesive tape is attached as the adhesive member onto the electrode foil.

4. The method of claim 1, wherein the method is characterized in that, in the coated part formation step S3, the active material is coated onto the electrode foil such that an end part of the electrode foil is not coated with the active material.

* * * * *